July 29, 1924.

F. F. JAMES

SHACKLE BOLT

Filed Dec. 28, 1923

1,503,162

Inventor
F. F. James,
By
Attorney

Patented July 29, 1924.

1,503,162

UNITED STATES PATENT OFFICE.

FRANCIS F. JAMES, OF PHILADELPHIA, PENNSYLVANIA.

SHACKLE BOLT.

Application filed December 28, 1923. Serial No. 683,158.

*To all whom it may concern:*

Be it known that I, FRANCIS F. JAMES, a citizen of the United States, residing at Philadelphia, in the county of Philadelphia and State of Pennsylvania, have invented new and useful Improvements in Shackle Bolts, of which the following is a specification.

The invention relates to a shackle bolt for connecting a spring with the shackle hangers.

An object of the present invention is to improve the construction of shackle bolts and to provide a simple, practical and efficient device of strong, durable and inexpensive construction adapted to be readily applied to the springs and shackle hangers of automobiles and other vehicles, and capable of ready adjustment to enable the shackle hangers to be properly spaced for preventing wear of the parts and capable also of effectually locking the parts to prevent the same from working loose.

It is also an object of the invention to provide a shackle bolt equipped with a central bronze bushing and opposite cone members capable of ready adjustment to take up the wear and constructed so that there will be no liability of causing the formation of shoulders on the cone members or in the cone bushing which might limit or otherwise interfere with the adjustment of the parts to take up the wear.

With these and other objects in view the invention consists in the construction and novel combination and arrangement of parts hereinafter fully described, illustrated in the accompanying drawings and pointed out in the claims hereto appended, it being understood that various changes in the form, uses of proportion and minor details of construction, within the scope of the claims, may be resorted to without departing from the spirit or sacrificing any of the advantages of the invention.

In the drawings, in which like characters of reference designate corresponding parts in the several views.

Figure 1:
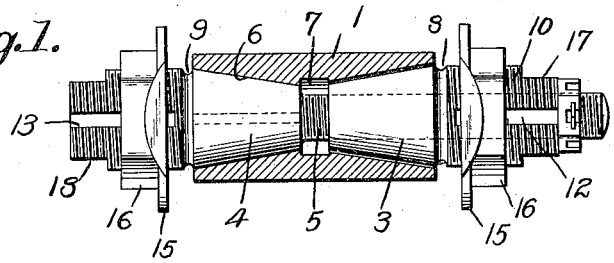
Figure 1 is a longitudinal view of a shackle bolt constructed in accordance with this invention, the cone and cone sleeve being shown in elevation.
Figure 2:
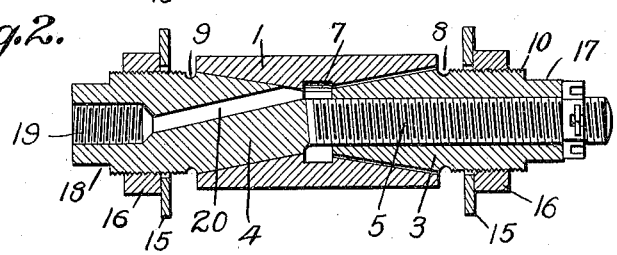
Figure 2 is a similar view, the cone members and other parts being shown in section.
Figure 3:
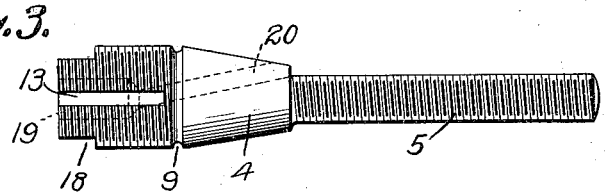
Figure 3 is a detailed view of the cone having the threaded shank.
Figure 4:
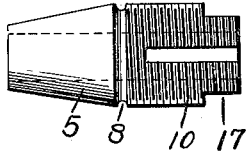
Figure 4 is a similar view of the cone sleeve.
Figure 5:
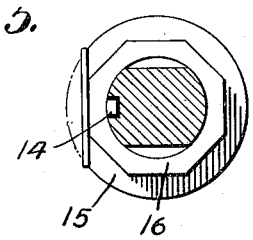
Figure 5 is a transverse sectional view illustrating the arrangement of the locking washer.

In the accompanying drawing, in which is illustrated the preferred embodiment of the invention, the shackle bolt comprises a bronze cone bushing 1 and cone members consisting of a cone sleeve 3 and a cone 4 provided with an integral threading stem or shank 5 which screws into the cone sleeve 3 and which adjustably connects the cone sleeve 3 with the cone 4. The bronze cone bushing is provided with opposite inwardly tapered bearing portions 6 which are separated by a central interior annular groove 7 of greater diameter than the inner ends of the cone bearings 6. The cone 4 and the cone sleeve fit within the cone bearings 6 and the said cone sleeve 3 and cone 4 are provided with annular grooves 8 and 9, located at the ends of the bronze bushing 2 and cooperating with the interior annular groove 7 to facilitate the adjustment of the cone members by eliminating all liability of the formation of shoulders in either the cone bushing or the cone members which might limit or affect the adjustment of the cone members 3 and 4 to take up the wear of the shackle bolt. This will enable a perfect fit of the parts to be maintained at all times and there will be no liability of twisting or lost motion of the parts. The cone bearing is designed to fit within the eye or opening of a vehicle spring and the cone members 3 and 4 are provided beyond the grooves 8 and 9 with similar outer exteriorly threaded portions 10 and 11 adapted to receive the shackle hangers which cooperate with the vehicle spring. The outer threaded portions 10 and 11 are spaced from the conical journaled portions of the cone members 3 and 4 by the said annular grooves 8 and 9 and they are provided with longitudinal grooves 12 and 13 adapted to receive lugs 14 of locking washers 15 which are arranged on the outer threaded portions of the cone members and which are adapted to be bent over nuts 16 for securing the same against retrograde rotation. The outer threaded portions may be flattened at opposite sides at 17 and 18 or they may be of uniform diameter throughout their entire length and the cone member 4 is provided in its outer end with a threaded socket 19 adapted to receive a grease cup and communicating with an inclined or diagonally disposed oil passage 20 extending from the socket 19 to the conical bearing or journalled portion of the cone member 4 for feeding lubricant to the cone bearings of the shackle bolt. This will enable the cone bearings of the shackle bolt to be properly lubricated. The outer end of the threaded shank or stem 5 of the cone member 4, receives a nut 21 which is preferably a Castle nut secured in its adjustment by a cotter pin. The nut and the locking device will secure the cone members in their relative adjustment. Any other suitable locking means may however, be employed.

While the bolt is illustrated in the drawing as a shackle bolt, it may of course, be employed for any other purpose, and the outer portions of the cone members may be made either with or without the exterior threads 10 and 11 in order that the bolt may be applied to one piece as well as two pieces shackles or members. The groove of the bushing facilitates lubrication of the parts.

What is claimed is:

1. A shackle bolt including a cone provided at the inner end with an integral threaded shank and cone sleeve interiorly threaded and arranged on the shank, said cone and cone sleeve being provided with exterior annular grooves, means for securing the cone and cone sleeve in their relative adjustment and a cone bushing having opposite inwardly tapered bearing portions receiving the cone and cone sleeve, said bushing having its ends located at the said annular grooves and being provided with an interior centrally arranged groove of greater diameter than the inner ends of its bearing portions, said grooves cooperating to permit free adjustment of the cone sleeve, cone and bushing, by preventing the formation of shoulders.

2. A shackle bolt comprising a cone provided at the inner end with an integral threaded shank, a cone sleeve interiorly threaded and arranged on the said shank, said cone and cone sleeve being provided at their outer ends with similar exteriorly threaded portions and having exterior annular grooves at the inner ends of the said threaded portions, and a cone bushing having opposite cone bearings and arranged on the said cone and cone sleeve and provided with a central interior annular groove spacing the bearing portions of the cone sleeve and cooperating with the exterior annular grooves of the cone and cone sleeve to prevent the formation of shoulders and insure free adjustment of the cone and cone sleeve in the cone bushing.

3. A shackle bolt comprising a cone provided at the inner end with an integral threaded shank, a cone sleeve interiorly threaded and arranged on the said shank, said cone and cone sleeve being provided at their outer ends with similar exteriorly threaded portions and having exterior annular grooves at the inner ends of the said threaded portions, a cone bushing having opposite cone bearings and arranged on the said cone and cone sleeve and provided with a central interior annular groove spacing the bearing portions of the cone sleeve and cooperating with the exterior annular grooves of the cone and cone sleeve to prevent the formation of shoulders and insure free adjustment of the cone and cone sleeve in the cone bushing, and means for having a threaded engagement with the cone sleeve and the cone for connecting the threaded extensions of the same with the shackles whereby the shackles are maintained in proper spaced relation throughout the adjustment of the shackle bolt and the latter prevented from lateral tilting.

In testimony whereof I have hereunto set my hand.

FRANCIS F. JAMES.